(12) United States Patent
Jowkar et al.

(10) Patent No.: US 11,945,168 B2
(45) Date of Patent: *Apr. 2, 2024

(54) COLORED OBJECT GENERATION

(71) Applicant: HEWLETT-PACKARD DEVELOPMENT COMPANY, L.P., Spring, TX (US)

(72) Inventors: Mohammad Jowkar, Sant Cugat del Valles (ES); Rhys Mansell, Sant Cugat del Valles (ES); Carmen Blasco Cortes, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/309,925

(22) PCT Filed: Apr. 30, 2019

(86) PCT No.: PCT/US2019/029866
§ 371 (c)(1),
(2) Date: Jun. 30, 2021

(87) PCT Pub. No.: WO2020/222794
PCT Pub. Date: Nov. 5, 2020

(65) Prior Publication Data
US 2022/0072795 A1 Mar. 10, 2022

(51) Int. Cl.
*B29C 64/393* (2017.01)
*B29C 64/165* (2017.01)
(Continued)

(52) U.S. Cl.
CPC .......... *B29C 64/393* (2017.08); *B29C 64/165* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 6,306,319 B1 | 10/2001 | Swain et al. |
| 6,375,874 B1 | 4/2002 | Russell et al. |
| (Continued) | | |

FOREIGN PATENT DOCUMENTS

| CN | 105346268 A | 2/2016 |
| CN | 107073826 A | 8/2017 |
| (Continued) | | |

OTHER PUBLICATIONS

Ju, Y., et al., "Visualization of the complex structure and stress field inside rock by means of 3D printing technology", Chinese Science Bulletin, vol. 59, Issue 36, Dec. 25, 2014, pp. 5354-5365.

(Continued)

*Primary Examiner* — Yung-Sheng M Tsui
*Assistant Examiner* — Melody Tsui
(74) *Attorney, Agent, or Firm* — Michael Dryja (57) ABSTRACT

In an example, a method includes obtaining object model data describing at least a portion of an object to be generated by additive manufacturing. A color value of a first portion of the object to be generated may be determined, wherein the color value is based on a first color and a second color, different from the first color. Object generation data to generate the object using a fusing agent of the first color and a build material having the second color may be determined by defining a first region of a layer of build material to which fusing agent is to be applied defining a second region of the build material to which detailing agent is to be applied to define an edge of the object and defining a spacing region of build material to separate the first region and second region, (Continued)

wherein the spacing region is defined using parameters selected to provide the color value.

20 Claims, 4 Drawing Sheets (51) Int. Cl.
  *B33Y 10/00* (2015.01)
  *B33Y 30/00* (2015.01)
  *B33Y 50/02* (2015.01)

(56) References Cited

U.S. PATENT DOCUMENTS

| | | | |
|---|---|---|---|
| 6,904,243 | B2 | 6/2005 | Smith et al. |
| 6,989,065 | B2 | 1/2006 | Tabor et al. |
| 7,678,317 | B2 | 3/2010 | Khouri et al. |
| 7,991,498 | B2 | 8/2011 | Kritchman |
| 9,990,447 | B2 | 6/2018 | Dawson et al. |
| 10,060,099 | B2 | 8/2018 | Serrurier et al. |
| 10,906,247 | B2 | 2/2021 | Flores et al. |
| 11,577,463 | B2 | 2/2023 | Huang et al. |
| 2004/0080078 | A1 | 4/2004 | Collins |
| 2005/0072113 | A1 | 4/2005 | Collins et al. |
| 2007/0183918 | A1 | 8/2007 | Monsheimer et al. |
| 2007/0241482 | A1 | 10/2007 | Giller et al. |
| 2015/0125334 | A1 | 5/2015 | Uetani et al. |
| 2015/0352639 | A1 | 12/2015 | Toyserkani et al. |
| 2016/0026001 | A1 | 1/2016 | Nishimura et al. |
| 2016/0037443 | A1 | 2/2016 | Kim et al. |
| 2016/0082537 | A1 | 3/2016 | Weber et al. |
| 2016/0243761 | A1 | 8/2016 | Okamoto |
| 2016/0260001 | A1 | 9/2016 | Flores et al. |
| 2016/0332380 | A1 | 11/2016 | De et al. |
| 2016/0374431 | A1 | 12/2016 | Tow |
| 2017/0232677 | A1 | 8/2017 | Emamjomeh et al. |
| 2017/0246807 | A1 | 8/2017 | Emamjomeh et al. |
| 2017/0297106 | A1 | 10/2017 | Myerberg |
| 2018/0001550 | A1 | 1/2018 | Zhao et al. |
| 2018/0015663 | A1 | 1/2018 | Zhao et al. |
| 2018/0022923 | A1 | 1/2018 | Emamjomeh et al. |
| 2018/0065297 | A1 | 3/2018 | Zhao et al. |
| 2018/0104897 | A1 | 4/2018 | Novick |
| 2018/0117856 | A1 | 5/2018 | Ochi |
| 2018/0147670 | A1 | 5/2018 | Wiggins et al. |
| 2018/0186079 | A1 | 7/2018 | Vilajosana et al. |
| 2018/0196407 | A1 | 7/2018 | Lee et al. |
| 2018/0319086 | A1 | 11/2018 | Klammer et al. |
| 2018/0361653 | A1 | 12/2018 | Hakkaku et al. |
| 2018/0370122 | A1 | 12/2018 | MacCormack et al. |
| 2019/0039296 | A1 | 2/2019 | Prasad |
| 2021/0122119 | A1 | 4/2021 | Fornos et al. |
| 2021/0187617 | A1 | 6/2021 | Zaepernick et al. |
| 2021/0221053 | A1 | 7/2021 | De et al. |

FOREIGN PATENT DOCUMENTS

| | | | |
|---|---|---|---|
| CN | 107206685 | A | 9/2017 |
| CN | 108699366 | A | 10/2018 |
| CN | 109070454 | A | 12/2018 |
| CN | 109070458 | A | 12/2018 |
| EP | 3094470 | A1 | 11/2016 |
| EP | 3230383 | A1 | 10/2017 |
| JP | 2005-254521 | A | 9/2005 |
| JP | 2016-168828 | A | 9/2016 |
| JP | 2017-530881 | A | 10/2017 |
| JP | 2018-531820 | A | 11/2018 |
| WO | WO-2016010590 | | 1/2016 |
| WO | 2016/077250 | A1 | 5/2016 |
| WO | WO-2016171724 | A1 | 10/2016 |
| WO | 2016/196382 | A1 | 12/2016 |
| WO | WO-2017019102 | A1 | 2/2017 |
| WO | 2017/074447 | A1 | 5/2017 |
| WO | 2017/131757 | A1 | 8/2017 |
| WO | 2017/131764 | A1 | 8/2017 |
| WO | 2017/186278 | A1 | 11/2017 |
| WO | 2017/188965 | A1 | 11/2017 |
| WO | 2017/188966 | A1 | 11/2017 |
| WO | 2017/196321 | A1 | 11/2017 |
| WO | 2017/196346 | A1 | 11/2017 |
| WO | 2017/196353 | A1 | 11/2017 |
| WO | 2017/200533 | A1 | 11/2017 |
| WO | 2017/213666 | A1 | 12/2017 |
| WO | 2018/006935 | A1 | 1/2018 |
| WO | 2018/010773 | A1 | 1/2018 |
| WO | 2018/017084 | A1 | 1/2018 |
| WO | 2018/022034 | A1 | 2/2018 |
| WO | 2018/022093 | A1 | 2/2018 |
| WO | 2018/080456 | A1 | 5/2018 |
| WO | WO-2018194542 | | 10/2018 |
| WO | 2019/013752 | A1 | 1/2019 |
| WO | WO-2019013745 | | 1/2019 |
| WO | WO-2019017869 | | 1/2019 |
| WO | 2019/083530 | A1 | 5/2019 |
| WO | 2019/108200 | A1 | 6/2019 |
| WO | 2019/177612 | A1 | 9/2019 |
| WO | 2019/194836 | A1 | 10/2019 |
| WO | 2019/209262 | A1 | 10/2019 |
| WO | 2019/212485 | A1 | 11/2019 |
| WO | 2019/245516 | A1 | 12/2019 |
| WO | 2019/245520 | A1 | 12/2019 |

OTHER PUBLICATIONS

Yu, G., et al., "Research on the Realization method of 3D Printing System of Metal Powder Based on Digital Micro Injection", Journal of Nanjing University, vol. 17, Issue 03, Sep. 2017, pp. 6.

COLORED OBJECT GENERATION

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected sub-regions. In other techniques, chemical solidification methods may be used.

BRIEF DESCRIPTION OF THE DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic or ceramic powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto regions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies upon cooling to form a slice of the three-dimensional object in accordance with the pattern. In this way, adding fusing agent to areas of the build material may change the absorptivity of those areas of the build material. In other examples, coalescence may be achieved in some other manner.

In an example, a suitable fusing agent may be an ink-type formulation comprising carbon black, such as, for example, the fusing agent formulation commercially known as V1Q60A "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based colored ink and pigment based colored ink, such as inks commercially known as CE039A and CE042A available from HP Inc. Adding a colored fusing agent (for example a black fusing agent) may change the color of the build material to which it is applied. For example, adding a black fusing agent to a white build material may result in the corresponding parts of the three-dimensional object to be generated being dark (e.g. black) in appearance.

In addition to a fusing agent, in some examples, a coalescence modifier agent may be used which acts to modify the effects of a fusing agent for example by modifying coalescence or to assist in producing a particular finish or appearance to an object, and such agents may therefore be termed detailing agents. Detailing agents may also be applied to produce a cooling effect. In some examples, detailing agent may be used near edge surfaces of an object being printed. According to one example, a suitable detailing agent may be a formulation commercially known as V1Q61A "HP detailing agent" available from HP Inc. In some examples, a detailing agent may be transparent. A coloring agent, for example comprising a dye or colorant, may in some examples be used as a fusing agent or a coalescence modifier agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object, and in some examples properties such as color, strength, density and the like. To generate a three-dimensional object from the model using an additive manufacturing system, the model data may in some examples be processed to generate slices of parallel planes of the model. Each slice may define a region of a respective layer of build material that is to be solidified or caused to coalesce by the additive manufacturing system.

When heat is applied to an area of a build material that is treated with fusing agent, heat from the area of build material may bleed into surrounding areas (e.g. in the same layer or between layers) and cause adjacent areas of build material (which were not intended to form a portion of the object being generated) to at least partially fuse and become a portion of the generated object. This may lead to objects having dimensions larger than were defined in an object model describing the object to be generated. To improve dimensional accuracy, a detailing agent may be applied immediately adjacent to areas of build material on which fusing agent is applied to reduce, or in some examples prevent, this thermal bleed from these areas of build material. In this way, a detailing agent may be applied to define the surface geometry of the object being generated.

When the fusing agent has a first color (for example black) and the unfused build material has a second color (for example white), thermal bleed can affect the surface color of a generated object. For example, if no thermal bleed has occurred, a part generated using a black fusing agent and white build material will be black or dark gray in color. However, if thermal bleed has occurred the surface color of the object may be light gray due to untreated white build material fusing to the surface of the object.

Some examples herein relate to controlling this thermal bleed effect by leaving a spacing region (also referred to herein as a gap region) between areas of build material where fusing agent has been applied and areas of build material where detailing agent has been applied, rather than applying these agents immediately adjacent to each other.

Figure 1:
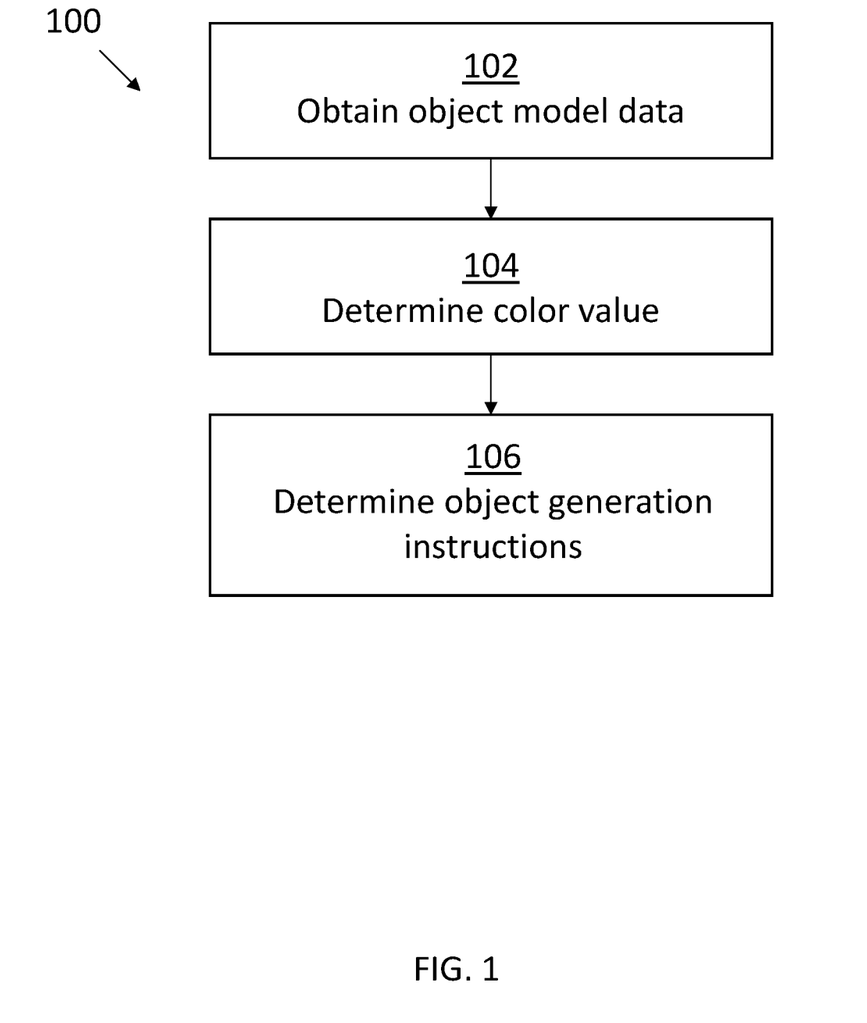
FIG. 1 is a flow chart of an example method of generating a three-dimensional object in a 3D printing system.

FIG. 1 is an example method, 100 which may be a method of generating a three-dimensional object in a 3D printing system using a fusing agent of a first color, a detailing agent (e.g. a transparent detailing agent), and a build material of a second color, the second color being different from the first color. The second color may have a different color property to the first color. For example, the second color may have a different hue, tint, shade, tone, saturation, lightness, chroma, intensity, brightness, reflectance, and/or greyscale. In one example the second color is darker than the first color.

The method 100 comprises, at block 102 obtaining (e.g. by a processor) object model data describing at least a portion of an object to be generated by additive manufacturing using a fusing agent of a first color and a build material having a second color different from the first color.

The object model data may comprise data representing at least a portion of an object to be generated by an additive manufacturing apparatus by fusing (e.g. thermal fusing through application of energy) or solidifying a build material. The object model data may, for example, comprise a Computer Aided Design (CAD) generated model, and/or may, for example, be represented in a suitable file format, such as in a STereoLithographic (STL) data file. In some examples, the object model data may be received over a network, or received from a local memory or the like. In some examples, the object model data may define the shape of the portion of an object, i.e. its geometry. In some examples, the data may additionally define an appearance property, for example at least one intended color, pattern, translucency, gloss or the like. In some examples the data may define at least one mechanical property, for example strength, density, resilience or the like. In some examples, the data may define at least one functional property, for example, conductivity in at least one object portion. Such properties may be associated with regions of the object, for example a color may be defined at an object surface.

In some examples, the object may be defined in terms of sub-volumes, each of which represents a region of the object which is individually addressable in object generation. In some examples herein, the sub-volumes may be referred to as voxels, i.e. three-dimensional pixels, wherein each voxel occupies or represents a discrete volume. In some examples of additive manufacturing, three-dimensional space may be characterized in terms of such voxels. In some examples, the voxels may be determined bearing in mind the print resolution of an object generation apparatus, such that each voxel represents a region which may be uniquely addressed when applying print agents, and therefore the properties of one voxel may vary from those of neighbouring voxel(s). In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape. In some examples, voxels are cuboids having the height of a layer of build material. In some examples, in processing object model data representing an object, each voxel may be associated with properties, and/or object generation instructions, which apply to the voxel as a whole.

In other examples, the object may be described in some other way, for example using a vector or polygon mesh-based model. In some such examples, a voxel model may be derived from another model type.

In some examples, the method of FIG. 1 may be carried out on a slice-by-slice basis. In some examples, each slice may correspond to a layer of an object to be generated in a layer-by-layer additive manufacturing process. In some examples, such slices may be slices of a virtual build volume modelling an intended 'real' build volume, and may comprise slices taken from more than one object model. In some examples, the slices may be one voxel thick.

Block 104 of method 100 comprises determining a color value of a first portion of the object to be generated, wherein the color value is based on the first and second colors. For example, the color value may be a value on a scale wherein the scale runs from the first color to the second color with the first and second colors defining end points of the scale, such that the color value may represent a third color, which is a combination of the first and second colors. The color value may be defined, for example, as a percentage of the first color and a percentage of the second color, or, for example as a number from 0 to n where 0 represents the first colour (e.g. white) and n represents the second color (e.g. black) such that n/2, for example would represent a color comprising 50% of each of the first and second colors. In some examples, where fusing agent is black and build material without fusing agent is white, the scale may be a grayscale. In other examples, the first and second colors may be other colors and the scale may be defined between these colors.

Block 106 comprises determining object generation instructions to generate the object by defining a first region of a layer of build material to which fusing agent is to be applied; defining a second region of the build material to which detailing agent is to be applied, to define an edge of the object; defining a spacing region of build material to separate the first region and second region and defining a level of color of a surface of the object to be generated, wherein the level of surface color is defined on a scale between the first color and the second color, and is controlled by controlling a parameter of the spacing region.

In some examples, the spacing, or "gap", region and the first and second regions may be formed on a single layer of build material. In some examples, each of these regions may be part of different adjacent layers of build material. In other words, the first region (the fusing agent region) may be a part of one or multiple layers of build material with the spacing region and/or the second region (the detailing agent band) being part of different layer(s), or part of one of the layers that comprises the fusing agent region. It will therefore be appreciated that the fusing agent region, spacing region and second region (the detailing agent band) may, in some examples, be part of the same layer of build material. In other examples the spacing region may be provided in a separate layer to the fusing agent region and/or the detailing agent band. In some examples, where build material is deposited in the z-axis in layers of a constant thickness, the number of available shades on the gray scale may be limited and quantised in the z-axis. In the x-y plane, in some examples the thickness of the spacing region can be relatively finely controlled at a print resolution of 1200 dpi, depending on the type of printhead.

Controlling a parameter of the spacing region may comprise controlling any parameter which affects how much build material from the spacing region will fuse to the first region. The build material from the spacing region which fuses to the first region may be thought of as forming an outer shell of build material having the second color on a core portion (defined by the first region) having a first color. The visible color of the first region will be at least partially obscured by the shell, with the level to which the color of the first region is obscured being determined by the thickness of the shell. In other words, when heat is applied to the first region, build material from the spacing region will attach to the surface of the first region due to thermal bleed. If a parameter of the spacing region is controlled to enable a greater amount of build material from the spacing region to fuse to the surface of the first region during printing, then the surface color of the object will be closer to the second color than if a lesser amount of build material from the spacing region is caused to fuse to the surface of the first region. If a sufficient amount of build material from the spacing region is available to fuse, the surface of the generated object will have the second color. If a parameter of the spacing region is controlled so that there is less build material available to attach to the surface due to thermal bleed, the generated object will have a surface color closer to the first color. The surface color may further be controlled to have a color at an intermediate point along the grayscale by controlling the parameter of the spacing region to provide an intermediate amount of available build material in the spacing region.

The method of FIG. 1 therefore enables 3D objects to be generated with a range of available color levels between the color of the fusing agent and the color of the build material. For example, where the fusing agent is black and the build material is white, the method enables parts to be produced with controllable grayscale color.

In some examples, controlling a parameter of the spacing region may comprise controlling a gap size between the first region and the second region. A larger gap size between the region of build material including fusing agent and the region of build material including detailing agent may result in a thicker layer of build material fusing to form a surface of the generated object, producing a surface color of, or closer to, the second color. The size of the spacing region can therefore be controlled to control a color level of a surface of the object on a scale between the first color (no spacing region) and a second color (fully coated with spacing region build material). For example, the size of the spacing region may be varied between 0 µm and 150 µm where 0 µm between the first region and the second region may correspond to a color level at one end of the color scale, corresponding to the first color (e.g. a dark gray color caused by the fusing agent) and 150 µm between the first region and the second region may correspond to a color level at the opposite end of the color scale, corresponding to the second color (e.g. a white or light gray color) In some examples, the spacing region may define a gap between the first region and the second region of between 20 µm and 150 µm.

In some examples, objects could therefore be produced having a number of different color levels on a single object by controlling different spacing regions located at different portions of the object differently, for example providing spacing regions with different gap sizes at different points around an object.

In some examples, controlling a parameter of the spacing region may comprise controlling an amount of print agent to be applied to the spacing region. For example, a print apparatus may apply a relatively small amount of print agent to the spacing region, at a concentration per amount of build material that is lower than an amount of print agent applied to the first region or the second region. Controlling the amount of print agent to be applied to the spacing region can be used to control how much build material from the spacing region will fuse with the outer surface of the first region. For example, applying a small amount of detailing agent to the spacing region may cause a lower proportion of the build material in the spacing region to fuse. Where detailing agent is applied to the spacing region, the amount of detailing applied to the spacing region is lower than the amount of detailing agent applied to the second region of build material. Applying a small amount of fusing agent to the spacing region may cause a higher proportion of the build material in the spacing region to fuse. In some examples, where transparent detailing agent is added to the spacing region, the amount of detailing agent per volume of build material in the spacing region may be between 1% and 90% of the amount of detailing agent per volume of build material in the second region. Where fusing agent is added to the spacing region, the amount of fusing agent per volume of build material in the spacing region may be between 1% and 90% of the amount of fusing agent per volume of build material in the first region. In some examples the fusing agent may have a color, which may have an effect on the overall surface color of the object portion. In some examples, a colorless or mainly colorless fusing agent may be applied to the spacing region. In some examples, the spacing region may be fully fused through thermal bleed. In some examples, applying print agent to the spacing region may enable greater temperature control of the spacing region.

Figure 2A:
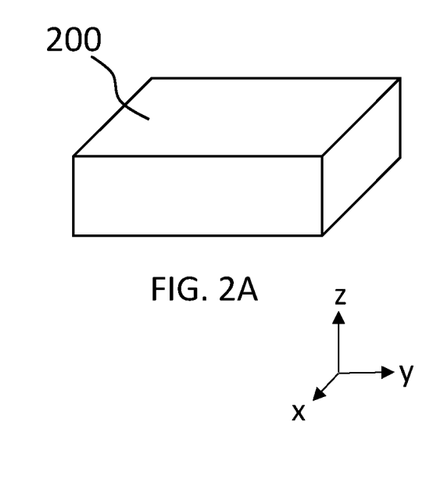
FIGS. 2A to 2C shows schematically part of an example method of generating a three-dimensional object in a 3D printing system.
Figure 2B:
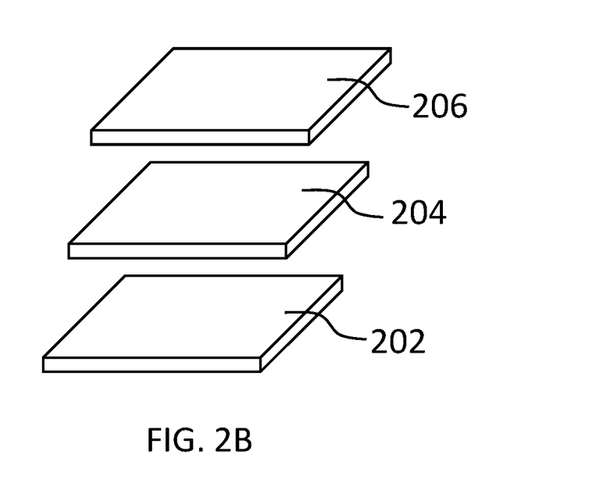

FIG. 2A shows an example representation of an object model 200 describing an object to be generated by additive manufacturing, such as the object model that may be obtained in block 102 of method 100. The object model 200 may be 'sliced' into a number of slices based on the thickness of the layer(s) of build material that will be used to generate the object from the object model 200. In this example the object model 200 is sliced horizontally relative to FIG. 2A (e.g. sliced by planes parallel to the z-axis, which is represented in FIG. 2A as the vertical axis) into three slices 202, 204, 206, e.g. a set of three 2D images that together define the object model 200, as shown in FIG. 2B.

Figure 2C:
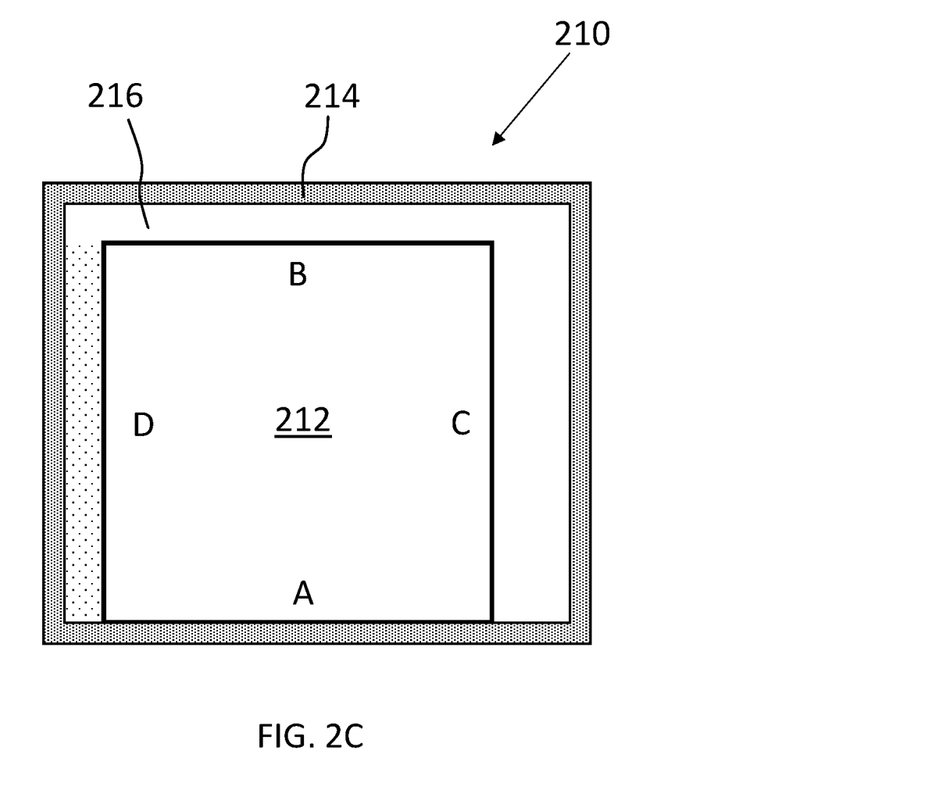

FIG. 2C shows an example of a representation of a layer of build material 210 to which print agents are applied in accordance with print data generated from a slice 202 of object model 200. The layer of build material 210 contains a portion 212 that comprises a first region or 'core' portion of the object. In the first region, sufficient fusing agent is applied to cause build material this portion to fuse under direct heat applied to this area by a heater (e.g. a heat lamp) of an additive manufacturing apparatus. In some examples, approximately 10 to 30 picoliters of fusing agent is applied per voxel location of build material for an example voxel having a height of one layer of build material and a surface area for receiving print agent of between 20×20 µm and 60×60 µm, for example 42×42 µm. The resolution of the printer, in some examples may be 600 dpi. The core portion may have a color defined by the fusing agent when combined with build material. In some examples, the color may be defined by the fusing agent, due to the fusing agent having a dark color (e.g. black) and the build material having a light color (e.g. white).

Build material layer 210 further comprises a second region 214 that defines a band of detailing agent to be applied to inhibit fusing of the build material. In some examples, some portions of the build material layer 210, for example on side A of the core portion 212 a detailing agent band 214 is applied directly adjacent to the core portion 212. For such portions, the intended color of the object to be generated is the color of the core portion 212, i.e. the color of the fusing agent. For a portion of the build material layer 210, for example adjacent to side B of core portion 212, a spacing region 216 is defined, which may be a gap region comprising build material to which no print agent e.g. fusing agent or detailing agent is to be applied, or to which print agent is to be applied so that the build material includes print agent at a lower relative concentration than the concentration of print agent within the build material in the core portion 212 or within the detailing agent band of the second region 214.

The object is to be generated in an additive manufacturing apparatus by applying print agents to the build material as specified in the object generation data generated by the additive manufacturing apparatus, and then applying heat to the build material. Build material that includes a sufficient amount of fusing agent will fuse under this direct heat and solidify to form a portion of the object corresponding to the core portion 212. Build material in the spacing region 216 does not contain sufficient fusing agent to cause the build material in that region to fuse under direct heat from a heater of the additive manufacturing apparatus. However, additional heat conducted or diffused into this area from the core portion 212 (i.e. due to thermal bleed) will cause build material in the spacing region to melt and fuse onto the core portion to form an outer shell or surface layer. How much of the color of the core portion is visible will depend on the thickness of this layer, i.e. on how much build material from the spacing region fuses onto the core portion. How much of the color of the core portion is visible through this surface layer will affect the overall color of the surface of the object, allowing the level of color of the object to be controlled by controlling the thickness of the outer shell. Object generation data based on an object model such as the object model that may be obtained in block 102 of method 100 will specify that detailing agent is to be applied to build material in the second region 214 of the layer of build material 210. Therefore, build material in this region will be prevented from fusing under direct heat or by thermal bleed. This enables an edge of the object to be well defined.

At side C of core portion 212, the adjacent spacing region 216 defines a greater distance between the core portion 212 and the second region 214 than at side B. Therefore, at the portion of the object to be generated that corresponds to side C of the core portion 212, a greater amount of build material will fuse to the surface of the object due to thermal bleed. Therefore, the color of the object at this point will be closer to the color of the build material (i.e. the second color) as the color of the core portion (build material with fusing agent applied) will be better obscured.

At side D of core portion 212, the adjacent spacing region 216 comprises a relatively low amount of print agent. For example, the spacing region 216 at side D may specify the application of a low amount of detailing agent. This will not completely prevent the build material in the spacing region 216 at side D from fusing with the core portion 212 but will have the effect of reducing the amount of build material from the spacing region that will fuse to the core portion, therefore providing a surface color of the object that is closer on the color scale to the first color (the color of the fusing agent) and further away from the second color (i.e. the color of the build material without fusing agent).

In one example, the build material may be formed of a granular material, such as a granular plastic material. The build material may be a powder, a liquid, a paste, or a gel. Examples of build material include semi-crystalline thermoplastic materials. For example, the build material may comprise a polyamide e.g. PA12, PA11 and/or PP (polypropylene) and the control data may be to apply fusing agent to the first region at a contone level of between 50-100 (e.g. 60) (which may in some examples represent between 20-40% of the maximum contone level that is deliverable from a printer generating the object).

Figure 3:
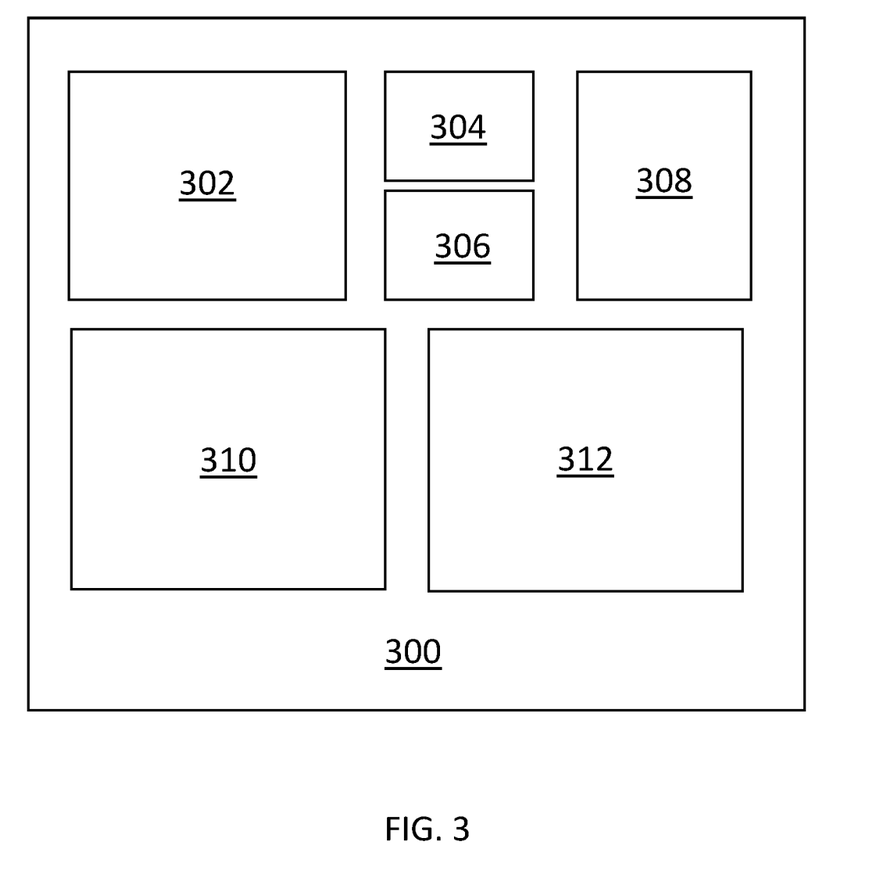
FIG. 3 is a simplified schematic drawing of an example apparatus for additive manufacturing.

FIG. 3 shows an apparatus 300, which may be an apparatus for generating a 3D object by additive manufacturing. In some examples, the apparatus 300 may be to perform a method as described above in relation to FIGS. 1 and 2. The apparatus 300 comprises a build material depositor 302; to deposit successive layers of build material, for example onto a print bed. The apparatus also includes a fusing agent depositor 304, and a detailing agent depositor 306, a heater 308 to apply heat to the build material and a processor 310 to obtain object model data. The object model data describing at least a portion of an object to be generated by additive manufacturing using a fusing agent of a first color and a build material of a second color, different from the first color, and a color value of a surface of the portion. The color value is based on the first and second colors (for example, the color value may represent a particular combination of the first and second colors).

The apparatus 300 further comprises a controller 312, wherein the controller is to control the fusing agent depositor 304 to deposit fusing agent onto a layer of build material in a first region in a first pattern derived from the object model data. In addition, the controller may be to control the detailing agent depositor 306 to deposit detailing agent onto a layer of build material in a second region in a second pattern derived from the object model data, wherein the second region is separated from the first region by a spacing region of build material. The controller 312 is further to control the fusing agent depositor and the detailing agent depositor to produce the first surface portion of the object with the color value defined by the object model data by controlling a parameter of the spacing region and to control the heater to direct heat onto the first region to solidify the build material in the first region, and to solidify a portion of the build material in the spacing region by indirect heat from the first region.

Deriving the first and second patterns from the object model data may comprise using mapping resources such as a look-up table or mapping algorithm to identity print agent amounts and/or combinations to apply to an object region corresponding to a particular segment, given target properties for that region.

In some examples the controller may be to control a parameter of the spacing region by controlling a gap size between the first region and the second region.

In some examples, the controller is to control a parameter of the spacing region by controlling an amount of print agent comprising detailing agent or fusing agent to be deposited onto the spacing region.

The 3-D printing apparatus 300 may generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer.

Figure 4:
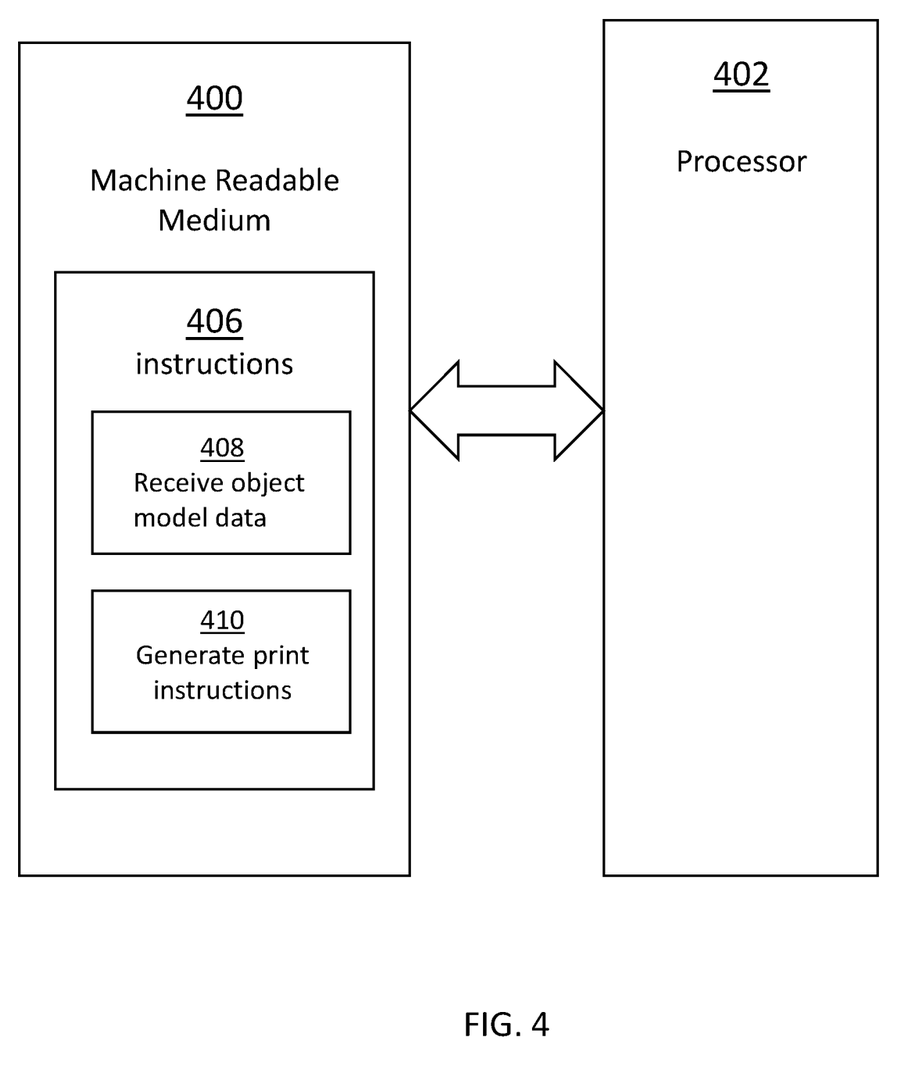
FIG. 4 is an example of a machine-readable medium in association with a processor.

FIG. 4 shows an example tangible machine-readable medium 400 in association with a processor 402. In some examples, the tangible machine-readable medium 400 may form part of an apparatus as described in relation to FIG. 3. The tangible machine-readable medium 400 comprises instructions 406 which, when executed by a processor 402, cause the processor 402 to carry out a plurality of tasks.

In some examples, the instructions 406 may cause the processor 402 to carry out methods described herein.

In the example shown in FIG. 4, the machine-readable medium 400 comprises a set of instructions 406 to cause the processor 402 to, at block 408, receive object model data describing an object to be manufactured and an intended surface color of a portion of the object, the intended surface color having a color value defined on a scale having end points defined by a first color comprising a color of a build material used to generate the object and a second color comprising a color of a fusing agent to be applied to the build material.

The instructions 406 further comprise, at block 410, instructions to cause the processor 402 to generate object generation instructions for generating an object using additive manufacturing from the object model data, wherein the object generation instructions specify a first pattern for applying fusing agent to a first region of build material and a second pattern for applying detailing agent to a second region of build material, wherein the second region is spaced from the first region by a spacing region of build material, and the object generation instructions are to specify at least one of a dimension of the spacing region and the application of print agent to the spacing region based on the intended surface color of the object at that layer.

In some examples, the dimension of the spacing region is a gap size or distance between the first region and the second region. In some examples, the print agent is a detailing agent. In some examples the application of print agent comprises applying detailing agent to the spacing region at an amount per area of build material that is lower than the amount of detailing agent per area of build material applied to the second region. In some examples, the print agent may comprise fusing agent, and the object generation instructions may comprise instructions to apply fusing agent to the spacing region at an amount per area of build material that is lower than an amount of fusing agent per area of build material to be applied to the first region.

It shall be understood that some blocks in the flow charts can be realized using machine-readable instructions, such as any combination of software, hardware, firmware or the like. Such machine-readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus and devices may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A system for generating a three-dimensional (3D) object using a 3D printing apparatus that employs build material, a fusing agent, and a detailing agent, the build material having a second color, the fusing agent having a first color different than the second color, the system comprising:

a processor; and
a memory storing instructions executable by the processor to:
  obtain object model data describing the object to be generated, the object having an exterior portion and an interior portion adjacent to the exterior portion;
  generate object generation instructions to generate the object by, for each of a plurality of layers of the build material:
    defining a gap region of the layer corresponding to the exterior portion of the object and on which no fusing agent and no detailing agent are to be applied;
    defining a fusing agent region of the layer adjacent to the gap region at an interior side thereof, corresponding to the interior portion of the object, and on which the fusing agent but no detailing agent is to be applied; and
    defining a detailing agent region of the layer adjacent to the gap region at an exterior side thereof, not corresponding to any portion of the object, and on which the detailing agent but no fusing agent is to be applied;
  cause the 3D printing apparatus to generate the object in accordance with the object generation instructions,
wherein the interior portion of the object has the first color of the fusing agent and is fused as a result of the fusing agent applied on the fusing agent region of each layer absorbing energy sufficient to melt the build material,
wherein the exterior portion of the object has a color based on the second color of the build material and the first color of the fusing agent in accordance with a thickness of the exterior portion, the exterior portion fused as a result of sufficient thermal bleed from the energy absorbed by the fusing agent on the fusing agent region adjacent to the gap region, and wherein the detailing agent region is not fused as a result of the detailing agent applied on the detailing agent region.

2. The system according to claim 1, wherein the exterior portion of the object is a first exterior portion, the gap region is a first gap region, and the detailing agent region is a first detailing agent region,
wherein the object further has a second exterior portion to which the interior portion is adjacent,
wherein the object generation instructions are to generate the object by further, for each layer of the build material:
defining a second gap region of the layer corresponding to the second exterior portion of the object and on which no fusing agent and no detailing agent are to be applied, the fusing agent region further adjacent to the second gap region at an interior side thereof; and
defining a second detailing agent region of the layer adjacent to the second gap region at an exterior side thereof, not corresponding to any portion of the object, and on which the detailing agent but no fusing agent is to be applied,
wherein the second exterior portion of the object has a color based on the second color of the build material and the first color of the fusing agent in accordance with a thickness of the second exterior portion, the second exterior portion fused as a result of sufficient thermal bleed from the energy absorbed by the fusing agent on the fusing agent region adjacent to the second gap region,
and wherein the second detailing agent region is not fused as a result of the detailing agent applied on the second detailing agent region.

3. The system according to claim 2, wherein the first exterior portion is thinner than the second exterior portion, such that the color of the first exterior portion is closer to the first color of the fusing agent than the color of the second exterior portion is, and such that the color of the second exterior portion is closer to the second color of the build material than the color of the first exterior portion is.

4. The system according to claim 2, wherein the first exterior portion is thicker than the second exterior portion, such that the color of the second exterior portion is closer to the first color of the fusing agent than the color of the first exterior portion is, and such that the color of the first exterior portion is closer to the second color of the build material than the color of the second exterior portion is.

5. The system according to claim 1, wherein the exterior portion of the object is a first exterior portion, the gap region is a first gap region, and the detailing agent region is a first detailing region,
wherein the object further has a second exterior portion to which the interior portion is adjacent,
wherein the object generation instructions are to generate the object by further, for each layer of the build material:
defining a second gap region of the layer corresponding to the second exterior portion of the object and on which a detailing agent but no fusing agent is to be applied;
defining a second detailing agent region of the layer adjacent to the second gap region at an exterior side thereof, not corresponding to any portion of the object, and on which the detailing agent but no fusing agent is to be applied,
wherein the second exterior portion of the object has a color based on the second color of the build material and the first color of the fusing agent in accordance with a thickness of the second exterior portion and an amount of the detailing agent applied on the second exterior portion, the second exterior portion fused as a result of sufficient thermal bleed from the energy absorbed by the fusing agent on the fusing agent region adjacent to the second gag region,
wherein the amount of the detailing agent applied on the second exterior portion is less than an amount of the detailing agent applied on the second detailing agent region and is insufficient to prevent fusing of the second exterior portion,
and wherein the second detailing agent region is not fused as a result of the amount of the detailing agent as plied on the second detailing agent region.

6. The system according to claim 1, wherein the 3D printing apparatus is to generate the object in accordance with the object generation instructions by:
depositing the layers of build material on a layer-by-layer basis and selectively applying the fusing agent and the detailing agent in accordance with the fusing agent region and the detailing agent region, respectively; and
applying the energy to the layers of build material to directly fuse the build material in the fusing agent region of each layer and to indirectly fuse the build material in the gap region of each layer via thermal bleed.

7. The system according to claim 1, wherein the 3D printing apparatus is part of the system.

8. The system according to claim 1, wherein the 3D printing apparatus is not part of the system.

9. A non-transitory computer-readable data storage medium storing instructions executable by a processor to perform processing for generating a three-dimensional (3D) object using a 3D printing apparatus that employs build material, a fusing agent, and a detailing agent, the build material having a second color, the fusing agent having a first color different than the second color, the processing comprising:
obtaining object model data describing the object to be generated, the object having an exterior portion and an interior portion adjacent to the exterior portion; generate object generation instructions to generate the object by, for each of a plurality of layers of the build material:
defining a gap region of the layer corresponding to the exterior portion of the object and on which no fusing agent and no detailing agent are to be applied;
defining a fusing agent region of the layer adjacent to the gap region at an interior side thereof, corresponding to the interior portion of the object, and on which the fusing agent but no detailing agent is to be applied; and
defining a detailing agent region of the layer adjacent to the gap region at an exterior side thereof, not corresponding to any portion of the object, and on which the detailing agent but no fusing agent is to be applied;
causing the 3D printing apparatus to generate the object in accordance with the object generation instructions,
wherein the interior portion of the object has the first color of the fusing agent and is fused as a result of the fusing agent applied on the fusing agent region of each layer absorbing energy sufficient to melt the build material,
wherein the exterior portion of the object has a color based on the second color of the build material and the first color of the fusing agent in accordance with a thickness of the exterior portion, the exterior portion fused as a result of sufficient thermal bleed from the energy absorbed by the fusing agent on the fusing agent region adjacent to the gap region, and wherein the detailing agent region is not fused as a result of the detailing agent applied on the detailing agent region.

10. The non-transitory computer-readable data storage medium according to claim 9, wherein the exterior portion of the object is a first exterior portion, the gap region is a first gap region, and the detailing agent region is a first detailing agent region, wherein the object further has a second exterior portion to which the interior portion is adjacent, wherein the object generation instructions are to generate the object by further, for each layer of the build material:

defining a second gap region of the layer corresponding to the second exterior portion of the object and on which no fusing agent and no detailing agent are to be applied, the fusing agent region further adjacent to the second gap region at an interior side thereof; and defining a second detailing agent region of the layer adjacent to the second gap region at an exterior side thereof, not corresponding to any portion of the object, and on which the detailing agent but no fusing agent is to be applied, wherein the second exterior portion of the object has a color based on the second color of the build material and the first color of the fusing agent in accordance with a thickness of the second exterior portion, the second exterior portion fused as a result of sufficient thermal bleed from the energy absorbed by the fusing agent on the fusing agent region adjacent to the second gap region, and wherein the second detailing agent region is not fused as a result of the detailing agent applied on the second detailing agent region.

11. The non-transitory computer-readable data storage medium according to claim 10, wherein the first exterior portion is thinner than the second exterior portion, such that the color of the first exterior portion is closer to the first color of the fusing agent than the color of the second exterior portion is, and such that the color of the second exterior portion is closer to the second color of the build material than the color of the first exterior portion is.

12. The non-transitory computer-readable data storage medium according to claim 10, wherein the first exterior portion is thicker than the second exterior portion, such that the color of the second exterior portion is closer to the first color of the fusing agent than the color of the first exterior portion is, and such that the color of the first exterior portion is closer to the second color of the build material than the color of the second exterior portion is.

13. The non-transitory computer-readable data storage medium according to claim 9, wherein the exterior portion of the object is a first exterior portion, the gap region is a first gap region, and the detailing agent region is a first detailing region, wherein the object further has a second exterior portion to which the interior portion is adjacent, wherein the object generation instructions are to generate the object by further, for each layer of the build material:

defining a second gap region of the layer corresponding to the second exterior portion of the object and on which a detailing agent but no fusing agent is to be applied;

defining a second detailing agent region of the layer adjacent to the second gap region at an exterior side thereof, not corresponding to any portion of the object, and on which the detailing agent but no fusing agent is to be applied, wherein the second exterior portion of the object has a color based on the second color of the build material and the first color of the fusing agent in accordance with a thickness of the second exterior portion and an amount of the detailing agent applied on the second exterior portion, the second exterior portion fused as a result of sufficient thermal bleed from the energy absorbed by the fusing agent on the fusing agent region adjacent to the second gap region, wherein the amount of the detailing agent applied on the second exterior portion is less than an amount of the detailing agent applied on the second detailing agent region and is insufficient to prevent fusing of the second exterior portion, and wherein the second detailing agent region is not fused as a result of the amount of the detailing agent applied on the second detailing agent region.

14. The non-transitory computer-readable data storage medium according to claim 9, wherein the 3D printing apparatus is to generate the object in accordance with the object generation instructions by:

depositing the layers of build material on a layer-by-layer basis and selectively applying the fusing agent and the detailing agent in accordance with the fusing agent region and the detailing agent region, respectively; and applying the energy to the layers of build material to directly fuse the build material in the fusing agent region of each layer and to indirectly fuse the build material in the gap region of each layer via thermal bleed.

15. A method for generating a three-dimensional (3D) object using a 3D printing apparatus that employs build material, a fusing agent, and a detailing agent, the build material having a second color, the fusing agent having a first color different than the second color, the method comprising:

obtaining, by a processor, object model data describing the object to be generated, the object having an exterior portion and an interior portion adjacent to the exterior portion; generate object generation instructions to generate the object by, for each of a plurality of layers of the build material:

defining a gap region of the layer corresponding to the exterior portion of the object and on which no fusing agent and no detailing agent are to be applied;

defining a fusing agent region of the layer adjacent to the gap region at an interior side thereof, corresponding to the interior portion of the object, and on which the fusing agent but no detailing agent is to be applied; and defining a detailing agent region of the layer adjacent to the gap region at an exterior side thereof, not corresponding to any portion of the object, and on which the detailing agent but no fusing agent is to be applied;

causing, by the processor, the 3D printing apparatus to generate the object in accordance with the object generation instructions, wherein the interior portion of the object has the first color of the fusing agent and is fused as a result of the fusing agent applied on the fusing agent region of each layer absorbing energy sufficient to melt the build material, wherein the exterior portion of the object has a color based on the second color of the build material and the first color of the fusing agent in accordance with a thickness of the exterior portion, the exterior portion fused as a result of sufficient thermal bleed from the energy absorbed by the fusing agent on the fusing agent region adjacent to the gap region, and wherein the detailing agent region is not fused as a result of the detailing agent applied on the detailing agent region.

16. The method according to claim 15, wherein the exterior portion of the object is a first exterior portion, the gap region is a first gap region, and the detailing agent region is a first detailing agent region, wherein the object further has a second exterior portion to which the interior portion is adjacent, wherein the object generation instructions are to generate the object by further, for each layer of the build material:

defining a second gap region of the layer corresponding to the second exterior portion of the object and on which no fusing agent and no detailing agent are to be applied, the fusing agent region further adjacent to the second gap region at an interior side thereof; and defining a second detailing agent region of the layer adjacent to the second gap region at an exterior side thereof, not corresponding to any portion of the object, and on which the detailing agent but no fusing agent is to be applied, wherein the second exterior portion of the object has a color based on the second color of the build material and the first color of the fusing agent in accordance with a thickness of the second exterior portion, the second exterior portion fused as a result of sufficient thermal bleed from the energy absorbed by the fusing agent on the fusing agent region adjacent to the second gap region, and wherein the second detailing agent region is not fused as a result of the detailing agent applied on the second detailing agent region.

17. The method according to claim 16, wherein the first exterior portion is thinner than the second exterior portion, such that the color of the first exterior portion is closer to the first color of the fusing agent than the color of the second exterior portion is, and such that the color of the second exterior portion is closer to the second color of the build material than the color of the first exterior portion is.

18. The method according to claim 16, wherein the first exterior portion is thicker than the second exterior portion, such that the color of the second exterior portion is closer to the first color of the fusing agent than the color of the first exterior portion is, and such that the color of the first exterior portion is closer to the second color of the build material than the color of the second exterior portion is.

19. The method according to claim 15, wherein the exterior portion of the object is a first exterior portion, the gap region is a first gap region, and the detailing agent region is a first detailing region, wherein the object further has a second exterior portion to which the interior portion is adjacent, wherein the object generation instructions are to generate the object by further, for each layer of the build material:

defining a second gap region of the layer corresponding to the second exterior portion of the object and on which a detailing agent but no fusing agent is to be applied;

defining a second detailing agent region of the layer adjacent to the second gap region at an exterior side thereof, not corresponding to any portion of the object, and on which the detailing agent but no fusing agent is to be applied, wherein the second exterior portion of the object has a color based on the second color of the build material and the first color of the fusing agent in accordance with a thickness of the second exterior portion and an amount of the detailing agent applied on the second exterior portion, the second exterior portion fused as a result of sufficient thermal bleed from the energy absorbed by the fusing agent on the fusing agent region adjacent to the second gap region, wherein the amount of the detailing agent applied on the second exterior portion is less than an amount of the detailing agent applied on the second detailing agent region and is insufficient to prevent fusing of the second exterior portion, and wherein the second detailing agent region is not fused as a result of the amount of the detailing agent applied on the second detailing agent region.

20. The method according to claim 15, wherein the 3D printing apparatus is to generate the object in accordance with the object generation instructions by:

depositing the layers of build material on a layer-by-layer basis and selectively applying the fusing agent and the detailing agent in accordance with the fusing agent region and the detailing agent region, respectively; and applying the energy to the layers of build material to directly fuse the build material in the fusing agent region of each layer and to indirectly fuse the build material in the gap region of each layer via thermal bleed.

* * * * *